US008281641B1

(12) United States Patent
Wooten et al.

(10) Patent No.: US 8,281,641 B1

(45) Date of Patent: Oct. 9, 2012

(54) TESTING SYSTEM FOR SELF-CONTAINED BREATHING APPARATUS REGULATOR

(75) Inventors: Jack Wooten, Lynn Haven, FL (US); Mark Black, Lynn Haven, FL (US); Tommy Hosea, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 586 days.

(21) Appl. No.: 12/462,937

(22) Filed: Aug. 3, 2009

(51) Int. Cl.

| | |
|---|---|
| ***A62B 27/00*** | (2006.01) |
| ***G01L 27/00*** | (2006.01) |
| ***G01L 27/02*** | (2006.01) |
| ***G01F 25/00*** | (2006.01) |

(52) U.S. Cl. ....... 73/1.68; 73/1.58; 73/1.66; 128/202.22

(58) Field of Classification Search ........................ None
See application file for complete search history.

(56) References Cited

U.S. PATENT DOCUMENTS

| | | | | |
|---|---|---|---|---|
| 4,258,713 | A * | 3/1981 | Wardlaw | 604/139 |
| 4,796,467 | A * | 1/1989 | Burt et al. | 128/202.22 X |
| 5,171,220 | A * | 12/1992 | Morimoto | 604/88 |
| 5,289,819 | A * | 3/1994 | Kroger et al. | 128/202.22 X |
| 5,303,712 | A * | 4/1994 | Van Duren | 600/529 |
| 5,860,418 | A * | 1/1999 | Lundberg | 128/202.22 |
| 6,722,499 | B2 * | 4/2004 | Reich | 206/365 |
| 8,025,053 | B1 * | 9/2011 | Prete et al. | 128/204.26 |
| 2002/0179089 | A1 * | 12/2002 | Morgan et al. | 128/204.26 |
| 2003/0172925 | A1 * | 9/2003 | Zocca et al. | 128/202.22 |
| 2005/0016255 | A1 * | 1/2005 | Naumiec et al. | 73/1.71 |
| 2005/0159714 | A1 * | 7/2005 | Gibson et al. | 604/288.03 |
| 2008/0053191 | A1 * | 3/2008 | Yoo et al. | 73/1.72 |

FOREIGN PATENT DOCUMENTS

| | | | |
|---|---|---|---|
| DE | 3322339 | A1 * | 1/1985 |
| EP | 125844 | B1 * | 8/1994 |
| JP | 2003240702 | A * | 8/2003 |
| JP | 3164123 | U * | 11/2010 |
| WO | WO 9116937 | A1 * | 11/1991 |
| WO | WO 9308454 | A1 * | 4/1993 |
| WO | WO 9407568 | A1 * | 4/1994 |

* cited by examiner

*Primary Examiner* — Thomas P Noland

(74) *Attorney, Agent, or Firm* — James T. Shepherd

(57) ABSTRACT

A Self-Contained Breathing Apparatus (SCBA) regulator is tested using a breath simulator having (i) a cup-shaped housing defining an interior volume and an open end, and (ii) an empty syringe with a plunger disposed therein and terminating in a dispensing tip coupled to the housing for sealed fluid communication with the interior volume thereof.

9 Claims, 2 Drawing Sheets

--- Prior Art ---

--- Prior Art ---

TESTING SYSTEM FOR SELF-CONTAINED BREATHING APPARATUS REGULATOR

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to testing regulators, and more particularly to a sanitary testing system for a Self-Contained Breathing Apparatus (SCBA) regulator that improves the efficiency of periodic regulator testing operations.

BACKGROUND OF THE INVENTION

Firefighting and “hazmat” breathing systems typically include a “Self-Contained Breathing Apparatus” (SCBA) regulator that must be periodically tested to assure proper operation. For example, the Navy’s required period for testing is every month. Currently, the test is performed by an operator that connects the regulator to a breathing system’s face piece. The operator then dons the face piece and breathes in and out to test the regulator’s operation. Once this task is completed, the operator must sanitize the regulator by washing and then drying the regulator. This process is tedious and time-consuming, especially when there are a substantial number of regulators that must be tested every month. For example, a Navy aircraft carrier has approximately 400 regulators that must undergo monthly, testing. The current regulator testing procedures require about 0.3 man-hours for an operational check and sanitizing procedure. Thus, on an annual basis, nearly 1500 man-hours are required to perform this operation for one Navy carrier.

SUMMARY OF THE INVENTION

Accordingly, it is an object of the present invention to provide a system and method for testing the operation of a SCBA regulator.

Another object of the present invention is to provide a system and method that reduces the amount of time that it takes to test the operation of a SCBA regulator.

Other objects and advantages of the present invention will become more obvious hereinafter in the specification and drawings.

In accordance with the present invention, a system and method of testing a Self-Contained Breathing Apparatus (SCBA) regulator are provided. The system is a breath simulator having (i) a cup-shaped housing defining an interior volume and an open end, and (ii) an empty syringe with a plunger disposed therein and terminating in a dispensing tip coupled to the housing for sealed fluid communication with the interior volume thereof. The open end of the breath simulator is coupled to the face piece of a SCBA regulator. The plunger is retracted to generate a vacuum pressure indicative of inhalation. The plunger is then depressed to generate a positive pressure indicative of exhalation.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
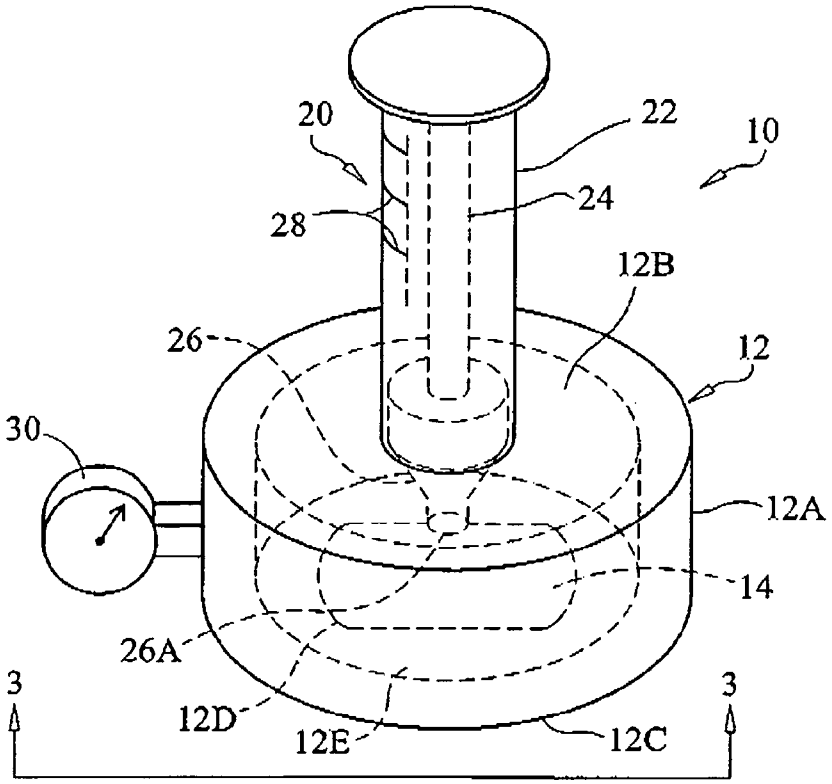
FIG. 1 is a perspective view of a SCBA regulator testing system in accordance with an embodiment of the present invention.

Referring now to the drawings and more particularly to FIG. 1, a system for testing a Self-Contained Breathing Apparatus (SCBA) regulator in accordance with an embodiment of the present invention is shown and is referenced generally by numeral 10. While system 10 is configured and will be described for use with the commercially-available EZ FLOW models 1 and 2 manufactured by Scott Health and Safety, Monroe, N.C., the novel features of the present invention are readily adapted to any conventional regulator.

Figure 2A:
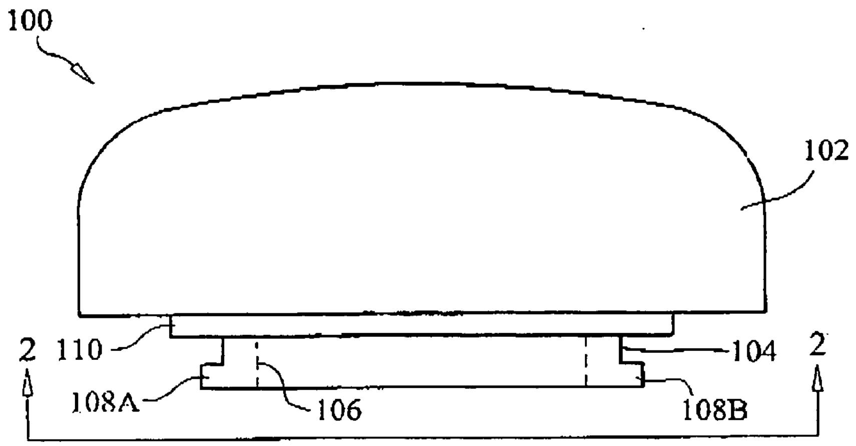
FIG. 2A is a side view of a commercially-available regulator.
Figure 2B:
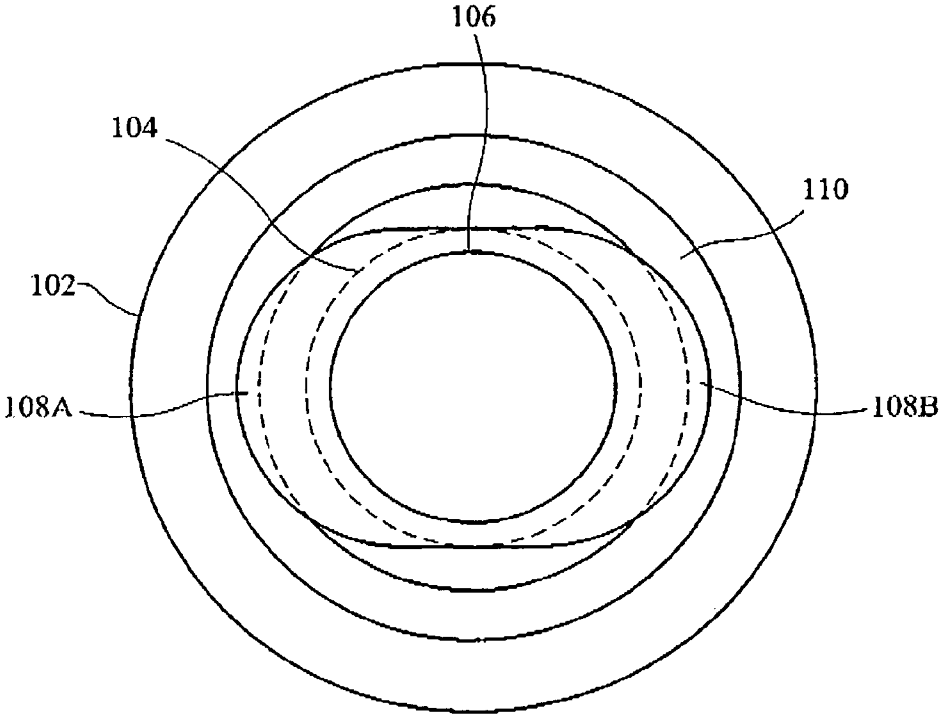
FIG. 2B is an end view of the regulator taken along line 2-2 in FIG. 2A.

To provide a better understanding of the present invention, a brief description of the salient features of the above-cited regulator will be provided herein with simultaneous reference to FIGS. 2A and 2B where the regulator is referenced generally by numeral 100. Regulator 100 includes a housing 102 from which a tube 104 extends and defines an opening 106 through which a user’s breathing air passes. Tube 104 is terminated by opposing wings 108A and 108B. An annular sealing gasket 110 is seated in housing 102 and surrounds tube 104. Gasket 110 is spaced apart from wings 108A and 108B and is partially overlapped thereby.

Figure 3:
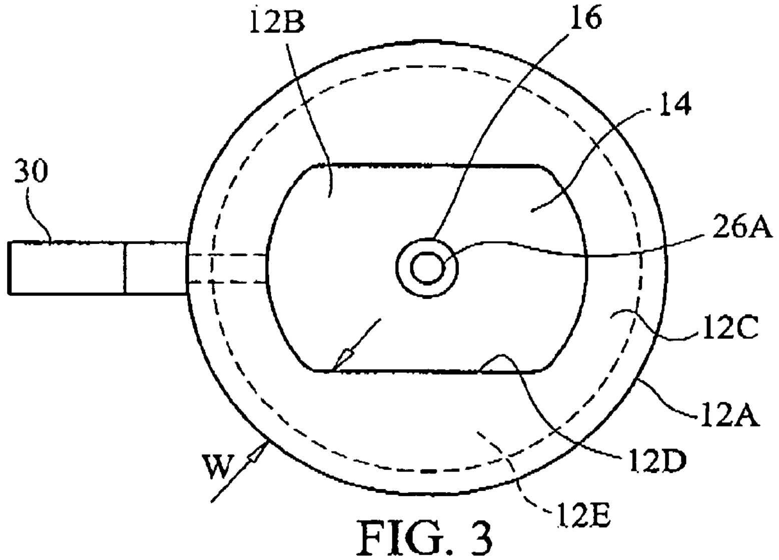
FIG. 3 is a view of the testing system taken along line 3-3 in FIG. 1.

System 10 includes a hollow, cup-shaped housing 12 having rigid side walls 12A and a top 12B. Typically, housing 12 is a single integrated element and can be made of plastic, composites, metal, etc., without departing from the scope of the present invention. Walls 12A and top 12B define an interior volumetric region 14, the perimeter of which is defined by walls 12A as is more clearly visible in the end view of system 10 illustrated in FIG. 3. Walls 12A terminate in top 12B at one end of housing 12 and in a rim 12C at the other (open) end of housing 12 where rim 12C defines a hole 12D. The shape of hole 12D is commensurate with that of the outline of wings 108A/108B about tube 104 while the size of hole 12D is just large enough to slip over wings 108A/108B. The portion of rim 12C facing volumetric region 14 forms an annular lip 12E. The thickness of rim 12C at opening 12D is slightly greater than the spacing between wings 108A/108B and gasket 110.

To couple/seal housing 12 to regulator 100, a user simply slips housing 12 over wings 108A/108B. Housing 12 is then pressed towards regulator 100 while rotating housing 12 one-quarter turn such that annular lip 12E defined by rim 12C engages wings 108A/108B while rim 12C presses against gasket 110 so that rim 12C can form a sealing fit therewith. Typically, rim 12C defines a planar surface of constant or variable width W that simplifies the coupling of housing 12 to gasket 110.

Mounted in top wall 12B is a plunger-type syringe 20 having a hollow body 22, a manually-operated plunger/piston mounted in body 22 and axially movable therein, and a dispensing tip 26 coupled to the end of body 22. Tip 26 has an open end 26A through which a fluid (not shown) can flow from or into body 22 when piston/plunger 24 is depressed into or retracted from, respectively, body 22. Body 22 can also include volume gradations 28 marked thereon. A variety of such syringes are well known and commercially-available.

Syringe 20 is coupled to housing 12 in a manner that places open end 26A in a sealed fluid communication with (volumetric region 14. This can be achieved in a variety of ways without departing from the scope of the present invention. For example, in the illustrated embodiment, tip 26 is mounted/sealed in a hole 16 provided through top 12B. However, the present invention is not so limited as additional structures could be provided to make the coupling of syringe 20 to housing 12 more robust. Such additional structures might include a body support structure integrated into top 12B and surrounding hole 16 for coupling to a portion of body 22. Furthermore, syringe 20 could be mounted in a side wall 12A of housing 12 without departing from the scope of the present invention.

Although not required for the present invention, system 10 can also include a device 30 for measuring the pressure in volumetric region 14 during use of system 10. Typically, device 30 is a pressure gauge capable of displaying a reading of positive or negative (vacuum) pressure. However, device could also be realized by a simple flexible diaphragm mounted in housing 12 and responsive to the pressure in volumetric region 14. In this case, the concavity or convexity of the diaphragm would indicate whether a positive or negative pressure existed in volumetric region 14.

In a testing operation, rim 12C is coupled to regulator 100 and sealed against gasket 110 as described above. With piston/plunger 24 in its depressed state, testing begins by retracting plunger/piston 24 to develop a simulated breath inhalation/vacuum pressure in volumetric region 14. The typical vacuum pressure to simulate a diver's inhalation is approximately −4 inches of water. If device 30 is present, retraction of plunger/piston 24 is continued until this vacuum pressure is achieved. Another option is for system 10 to be calibrated such that a particular gradation on body 22 is indicative of the desired vacuum pressure for a given volumetric region 14. A simulated exhalation is achieved when plunger/piston 24 is depressed until a positive pressure of approximately +4 inches of water is achieved. Once again, device 30 can be used if it is present in system 10. This cycle of simulated inhaling/exhaling is typically repeated a number of times to assure proper operation of the regulator. When testing is complete, housing 12 is simply separated from the face piece.

The advantages of the present invention are numerous. The testing system presents a solution to the testing of SCBA regulators that is simple, quick and sanitary. The reduction in time and energy makes such testing more affordable while reducing the tediousness of the task for testing personnel.

Although the invention has been described relative to a specific embodiment thereof, there are numerous variations and modifications that will be readily apparent to those skilled in the art in light of the above teachings. For example, the housing's rim and opening formed thereby can be sized/shaped for any regulator without departing from the scope of the present invention. It is therefore to be understood that, within the scope of the appended claims, the invention may be practiced other than as specifically described.

What is claimed as new and desired to be secured by Letters Patent of the United States is:

1. A system for testing a Self-Contained Breathing Apparatus (SCBA) regulator, comprising:

a cup-shaped housing defining an interior volume and an open end formed by an annular rim of said housing;

an empty plunger-type syringe having a dispensing tip, said syringe coupled to said housing with said dispensing tip in sealed fluid communication with said interior volume; and a device coupled to said housing for indicating one of pressure and vacuum in said interior volume.

2. A system as in claim 1 wherein said device comprises a pressure gauge.

3. A system as in claim 1 wherein, when said open end of said housing is sealed, said syringe has a volume sufficient to provide for the generation of a vacuum pressure of approximately −4 inches of water and a positive pressure of approximately +4 inches of water.

4. A system for testing a Self-Contained Breathing Apparatus (SCBA) regulator, comprising:

a rigid, cup-shaped housing defining an interior volume and an open end adapted to form a sealing relationship with a gasket of a SCBA regulator;

an empty syringe having a plunger disposed therein and terminating in a dispensing tip, said syringe coupled to said housing with said dispensing tip in sealed fluid communication with said interior volume; and a device coupled to said housing for indicating one of vacuum and pressure in said interior volume when said plunger is retracted and depressed, respectively.

5. A system as in claim 4 wherein said device comprises a pressure gauge.

6. A system as in claim 4 wherein, when said open end of said housing is sealed to the gasket of the SCBA regulator, said syringe has a volume sufficient to provide for the generation of a vacuum pressure of approximately −4 inches of water and a positive pressure of approximately +4 inches of water.

7. A method of testing a Self-Contained Breathing Apparatus (SCBA) regulator, comprising the steps of:

providing a breath simulator having (i) a rigid cup-shaped housing defining an interior volume and an open end, (ii) an empty syringe with a plunger disposed therein and terminating in a dispensing tip coupled to the housing for sealed fluid communication with the interior volume thereof, and (iii) a pressure gauge coupled to the housing for indicating one of vacuum and pressure in the interior volume;

coupling the open end of the breath simulator in a sealed fashion to a SCBA regulator;

retracting the plunger until the pressure gauge detects a vacuum pressure of approximately −4 inches of water; and depressing the plunger until the pressure gauge detects a positive pressure of approximately +4 inches of water.

8. A method according to claim 7 further comprising the step of repeating said steps of retracting and depressing in sequence.

9. A method according to claim 8 wherein said step of repeating occurs a plurality of times.

* * * * *